Patented Apr. 10, 1928.

1,665,634

UNITED STATES PATENT OFFICE.

JOHN WESLEY MARDEN, OF EAST ORANGE, NEW JERSEY, ASSIGNOR TO WESTINGHOUSE LAMP COMPANY, A CORPORATION OF PENNSYLVANIA.

PREPARATION OF METAL HALIDES.

No Drawing.    Application filed September 3, 1921. Serial No. 498,397.

My invention relates to the production of metal halides, and more particularly to the production of refractory metal halides from their hydrated salts.

An object of my invention is to provide a practical process for the production of the anhydrous halides of certain metals which will enable such products to be produced on a commercial scale.

Other objects will be apparent from a reading of the following description.

Anhydrous halides of the refractory metals, such as the chlorides, bromides, fluorides, etc., of chromium, uranium, thorium, etc., cannot be purchased so freely in the open market as many other chemical compounds, this being probably due to the expense involved in manufacturing such salts which makes the price demanded for them prohibitive to the average user. Such salts as are obtainable cheaply in commerce are frequently found to be contaminated or else in the hydrated form, so that, when the pure products are desired, the purchaser must resort to chemical treatment in order to obtain them. However, due to the strong affinity which the refractory metals generally have for other substances, particularly oxygen, it is difficult to produce, even in the laboratory, either the metals or their halides in their pure state.

One of the methods which has been resorted to for the production of the anhydrous halides, such as thorium tetrachloride, uranium tetrachloride, chromium chloride, etc., in their pure state is the distillation process. This mode of treatment may be briefly stated to comprise heating the oxide of any selected metal with carbon in a stream of dry chlorine, carbon tetrachloride, sulphur chloride, phosgene, or other chlorine-containing reducing agent. The process is performed in a large porcelain or silicia tube through which the dry reducing gas is passed to remove any trace of moisture or other contaminating substance. Then the temperature of the mixture is raised to about 800° C. when the metals undergoing treatment are thorium, chromium, or uranium. During the reaction which takes place, the chloride of the metal is formed and is distilled away from the carbon and oxide, collecting in the cooler portion of the tube.

Considerable care must be exercised in practicing the aforementioned process, for, should any moisture, oxygen or other contaminating substances be introduced, the pure chloride or other halide of the metal would not be obtained. Furthermore, the time required for the distillation to take place is very long, which, obviously, is not conducive to cheapness and quantity production.

It has long been known that, if a salt, such as thorium chloride, for example, is evaporated to dryness from a water solution, the anhydrous chloride ($ThCl_4$) is not obtained, but the oxy-chloride ($ThOCl_2$) is formed. The reaction may be represented as follows:

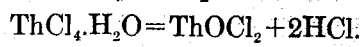

This, on further heating, reacts as follows:

Similarly, if, say, hydrated thorium chloride ($ThCl_4.8H_2O$) is ignited in air, oxidation takes place and a part of the thorium is finally left as oxide. If, however, to the aqueous solution of $ThCl_4$ sufficient sodium chloride is added and this is evaporated to dryness, the salt $Na_2ThCl_6.H_2O$ is formed, which, if heated in dry HCl gas, or in any other oxygen-free anhydrous atmosphere, produces the dry salt $Na_2ThCl_6$. If $ThCl_4.8H_2O$ is heated in the same way in a dry oxygen-free gas, the oxy-salt always remains.

In seeking an explanation of the reason why anhydrous double salts can be prepared when the simpler forms always contain moisture and are converted to oxy-salts when heated, recourse was had to Werner's Theory of Primary and Secondary Valences.

In applying this theory, in order to explain these phenomena, I prefer to employ chromium as an example of a refractory metal, because, for various reasons, it serves the purpose in hand probably better than one of the other metals. However, I wish it to be understood, in this connection, that chromium is not the only metal for which this theroy holds true, but that the reasons are identical for the same reactions in the cases of the other refractory metals, particularly thorium or uranium.

According to Werner's theory, the formula for the hexahydrated chromic chloride ($CrCl_3 6H_2O$), which is the salt which chromium normally forms from an aqueous solution, should be written—$Cr(H_2O)_6Cl_3$, or in some cases—

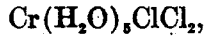

$$Cr(H_2O)_5ClCl_2,$$

depending on whether two-thirds or all of the chlorine can be precipitated by means of silver nitrate from an aqueous solution and whether there are 5 or 6 molecules of water of crystallization in the compound. The chromium has a coordination number of six, or it is able to hold within the positive nucleus or radical, which is the substance included within the brackets, six molecules of water or, as has been well-shown, molecules of ammonia, etc. That is to say, the metal in the positive radical has a secondary valence which holds substances within the radical, this valence being additional to that which it has for the chlorine or other negative radical. If on igniting a salt of this type which contains water within the positive nucleus when the valency bonds are very strong, it is known that some of the water is retained in this positive nucleus and the oxy-salt is formed with a liberation, in the case of chromium, of hydrogen chloride.

I, therefore, conceived the idea of replacing all the water in the positive nucleus by means of a substance which would readily volatilize at a temperature below that at which the salt passes into the vapor state, it then only being necessary, in order to obtain the anhydrous salt, to remove the water and the displacing substance from the compound in an environment free from contaminating substances which would tend to prevent the formation of the salt.

My invention, briefly stated, comprises a process of obtaining an anhydrous halide by dissolving any salt of a metal in water, converting the solute into its chloride (when necessary), adding a sufficient quantity of a volatile substance, such, for instance, as ammonium chloride, which will replace the water held by the metal through its secondary valence in the positive nucleus or radical, evaporating the solution to dryness to librate the water and probably some of the chloride or displacing substance, and then gently igniting the residue away from moisture or other contaminating substance, to decompose it into the anhydrous salt, which remains behind, and the volatile chloride or other displacing volatile substance, which distills away.

To enable those skilled in the art to practice my invention, I will describe, in detail, the process, as applied to certain specific substances, and will select for the purposes of such illustration the hexahydrated chromium chloride $Cr(H_2O)_6Cl_3$ as a salt which can be dehydrated, and employ as the displacing substance, or the volatile substance which takes the place of the water in the positive radical, ammonium chloride.

I wish it understood, however, that any salt which cannot readily be volatilized and which forms oxy-chlorides or oxides or oxygen contaminations upon direct ignition of these hydrates, such, for instance, as the hydrated salts of $ThCl_4$, $UCl_4$, $CrCl_3$, the rare earth chlorides, ferric fluoride ($FeF_3$), vanadium trichloride ($VCl_3$), and many other halide compounds which may be obtained in the open market at comparatively reasonable prices, may be employed as the substance which it is desired to dehydrate and reduce to the anhydrous form. Also that, if such salt is other than the chloride, any of the well-known chemical methods may be employed to convert such salt into the chloride. Furthermore, the displacing substance need not necessarily be ammonium chloride, the particular substance selected depending, to a large extent, upon the selected salt and the mode of treatment followed up to the point where such substance is added.

The ordinary hexahydrated chromium chloride may first be placed in solution by dissolving it in water, the latter serving as a favorable ionizing medium. Inasmuch as this salt contains the chloride, it is not necessary to follow the second step mentioned heretofore, that is, of converting the solute to the chloride, therefore, this step may be safely omitted. To the solution thus formed, a sufficient quantity of ammonium chloride may be added. By sufficient quantity, I mean the necessary amount by weight or volume necessary to effect the displacement of the water from the positive nucleus of the salt. Usually an equal weight will suffice, although the quantity may be altered as experience dictates, since even as much as twice the weight may be added. The addition of the ammonium chloride to the solution causes the water which is held by the secondary valence of chromium in the positive radical or nucleus to be displaced by the ammonia or ammonium chloride, the latter taking its place in the complex or positive radical. The water thus displaced is liberated from the solution by heat treatment, as by evaporation, or any other desired mode of treatment. When evaporated off, some of the ammonium chloride may also volatilize. Usually the evaporation step is carried on at a temperature slightly above the boiling point of water and is continued until there remains the dry salt $CrCl_3$, containing some ammonium chloride. The evaporation of the solution to dryness may be conducted in any of the well-known ways, but it is preferable that it be performed in such manner that there will be no likelihood of contamination occurring. I have found evaporation by means of a water or steam bath to be preferable. The double salt should thereafter be heated to a sufficiently high temperature to volatilize the ammonium chloride and thus decompose the mixture, the pure anhydrous chromium chloride ($CrCl_3$) remaining in the treating vessel. In order to prevent interaction of any moisture or other contaminating substance with the chromium chloride, it is preferable to effect the decomposition of the double salt in an inert environment, such as a vacuum, or in dry hydrogen chloride gas or moisture-free atmosphere, i. e. in an atmosphere which contains no substance which will contaminate the anhydrous salt or which will chemically combine with the chromium chloride to prevent the formation of the anhydrous salt. The evaporation and ignition steps may be combined in certain instances where found desirable, the solution merely being heat treated to the requisite point.

It will thus be seen that anhydrous halides of certain metals, particularly of the refractory metals, are readily obtainable by practicing the method outlined. Furthermore, if desirable, the process may be discontinued at the point where the double salt is formed and but part of the process used for obtaining a double salt which may be handled without danger of contamination, and from which, by appropriate treatment, as described in my divisional application Serial No. 624,031, filed March 8, 1923, on the preparation of metals, the pure powder of the refractory metal may be obtained, or else an alloy of such metals with other metals, aluminum, for instance, may be secured.

This salt, prepared by the methods described above, either as the anhydrous chloride, or, in certain cases, as double salts, such as $Na_2ThCl_6$, may be used for the production of aluminum or other alloys.

In preparing an alloy from either the anhydrous salt or the double salt, the salt may be fused with a mixture of sodium and potassium chlorides or fluorides in a graphite dish for the preparation of the refractory metal. In case an aluminum alloy is desired, several times the amount of aluminum which is necessary to make the reduction is added to the fused mixture in small quantities so that the reaction is not too violent. The thorium, for example, is reduced to the metallic condition by the aluminum and is dissolved in the excess of molten aluminum which collects in the bottom of the graphite dish. After the excess of aluminum has been added and the reaction is complete, the heating is continued for about twenty minutes so that the aluminum-thorium alloy mass collects and separates itself from the fused salt. After collecting, the salt is washed out by water and the aluminum button is broken up into small pieces by any convenient means. The excess of aluminum is dissolved away by treating with a solution of caustic soda and later treating with dilute hydro-chloric acid or any other convenient acid. The thorium-aluminum alloy thus formed is in little shiny-platelets which are more resistive to the action of dilute acids and chemical agents than thorium itself. This alloy has use in preparing the oxygen-free thorium metal, for, by distilling the aluminum away by heat treatment in an inert environment, the pure metal may be obtained. Aluminum alloys of other rare metals may be made in the same manner, and magnesium alloys of some of these metals may be prepared in this way. The process of production of aluminum alloys and the pure metals therefrom, forms the subject matter of an application for patent filed by me, Ser. #504,154, filed September 29, 1921, on production of rare metals and alloys thereof.

Anhydrous halides or double halide salts may find use in the preparation of the metals or metal alloys by electrolysis or by methods previously described by me in Patent No. 1,437,984, granted December 5, 1922, on the preparation of rare metals, in which the halide is treated with somewhat less than theoretical quantities of aluminum in a high-vacuum, high-frequency furnace where the excess of salt and all impurities are completely volatilized away.

In selecting halide salts which will serve best in the preparation of anhydrous halides, no fixed rule can be laid down, but I believe that almost any of the well-known salts will do. However, practice may predict what salts are preferable after a more careful study has been made of the constitution of the salts and their chemical behavior in aqueous solutions.

Although I have used ammonium chloride as the displacing substance or radical which might be introduced into the complex or positive nucleus or radical, it is believed that many other radicals will serve as well, such, for example, as the alkali metal halides. Ammonium salts are preferable because they may be obtained in commerce without great expense and, furthermore, because of their low volatilization temperature.

No reason is seen why the fluorides, as well as the other halogens, will not serve equally as well if not better than the chlorides.

Such modifications of the foregoing process which may suggest themselves and which may be considered as falling within the scope of the appended claims are contemplated by my invention.

What is claimed is:

1. The process of producing anhydrous halides of refractory metals which consists in dissolving a hydrated salt of a refractory metal in water, converting the same into the chloride, adding to the solution a substance which will displace the water element from the positive complex of the salt, separating the water from the solution and igniting the residue in an anhydrous atmosphere to remove the said substance.

2. The process of producing anhydrous halides of refractory metals which consists in making a solution of a hydrous salt of a refractory metal, converting the solute into the chloride, adding a volatile substance which will react with the salt and displacing the water in the positive nucleus of the salt, evaporating to dryness and igniting the compound in an environment free from contaminating substances.

3. The process of producing metallic anhydrous halides of highly refractory metals which consists in dissolving an ordinary hydated salt of a refractory metal in water, displacing the water from the positive radical by adding ammonium chloride to the solution, evaporating the solution to dryness and heating the residue in an inert environment.

4. The process of preparing anhydrous halides of highly refractory metals which consists in dissolving any salt of a refractory metal in water, converting the solute into a chloride, adding ammonium chloride in sufficient quantity, evaporating to dryness and gently igniting the residue away from the air, oxygen or any trace of moisture.

5. The process of producing anhydrous chromic chloride which consists in making an aqueous solution of hexahydrated chromic chloride, adding approximately an equal weight of ammonium chloride thereto, evaporating to dryness and decomposing the remaining compound by ignition in an inert environment.

6. The process of producing anhydrous chromium chloride which consists in dissolving a portion of hexahydrated chromic chloride in water, adding approximately an equal weight of ammonium chloride to the solution, evaporating the solution to dryness to remove the water and part of the ammonium chloride, and heating the salt in dry hydrogen chloride to remove the ammonium chloride.

7. The process of preparing a dry double salt of a refractory metal which comprises dissolving an ordinary hydrated salt of a refractory metal in water, displacing the water from the positive radical by adding ammonium chloride to the solution and evaporating to dryness.

8. The process of preparing a dry double salt of chromium which comprises dissolving hexahydrated chromic chloride in water, adding an equal portion by weight of ammonium chloride to the solution and evaporating to dryness.

In testimony whereof, I have hereunto subscribed my name this 5th day of September 1921.

JOHN WESLEY MARDEN.